United States Patent
Heiz et al.

[15] 3,701,101
[45] Oct. 24, 1972

[54] MODULAR REMOTE CONTROL AND SUPERVISORY SYSTEM SWITCHGEAR

[72] Inventors: Max Heiz, Suhr, Aargau, Switzerland; Rudolf Kalocay, Hannover, Germany

[73] Assignee: Sprecher & Schuh AG, Aarau, Switzerland

[22] Filed: Nov. 6, 1969

[21] Appl. No.: 874,664

[30] Foreign Application Priority Data

Nov. 6, 1968   Switzerland.............16559/68
Oct. 15, 1969   Switzerland.............15452/69

[52] U.S. Cl..............................340/163, 340/213.1
[51] Int. Cl..................................................H04q 9/00
[58] Field of Search............340/147, 163, 150–151, 340/213.1

[56] References Cited

UNITED STATES PATENTS

| | | |
|---|---|---|
| 3,200,380 | 8/1965 | MacDonald et al. ...340/150 X |
| 3,320,589 | 5/1967 | Jensen.......................340/147 |
| 3,349,374 | 10/1967 | Gabrielson et al.........340/163 |
| 3,427,589 | 2/1969 | Robinson et al...........340/147 |
| 3,445,813 | 5/1969 | Price..........................340/150 |
| 3,470,542 | 9/1969 | Trantanella................340/150 |
| 3,457,559 | 7/1969 | Hubbard..................340/213.1 |

Primary Examiner—Donald J. Yusko
Attorney—Waters, Roditi, Schwartz & Nissen

[57] ABSTRACT

A switchgear or switchboard comprises a plurality of switching units including command devices, switching devices and signalling devices which are combined according to given switching functions, each of the command devices and switching devices comprises transmitters for delivering command signals and each of the switching devices and signalling devices comprises receivers for receiving the command signals. The command, switching and signalling devices are contained in slide-in units inserted into shelves of a switch-box. Each switch-in unit comprises the transmitters and receivers for the devices contained in the respective switch-in unit, and the transmitters and receivers of all slide-in units are connected to a control cable interconnecting the slide-in units. The control cable is connected to a central unit producing address signals in cyclic sequence and comprising a signal generator for producing read-out signals of a time period which is shorter than that of the address signals.

19 Claims, 13 Drawing Figures

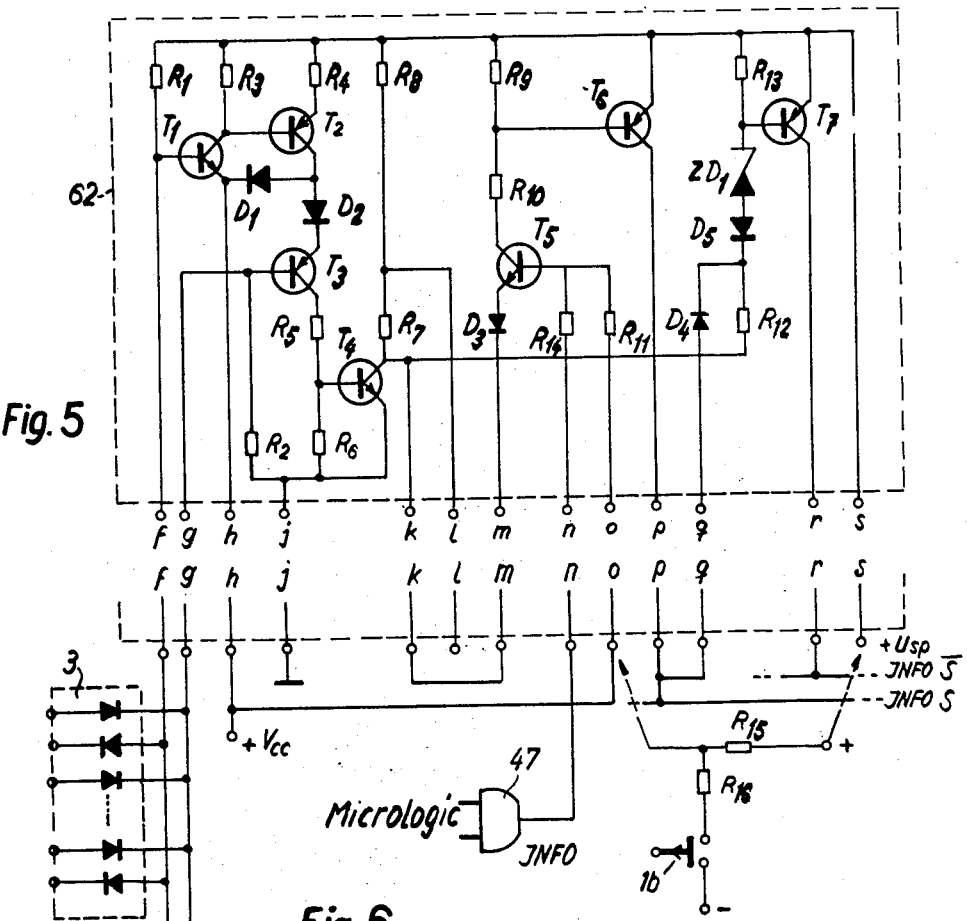
Fig. 5
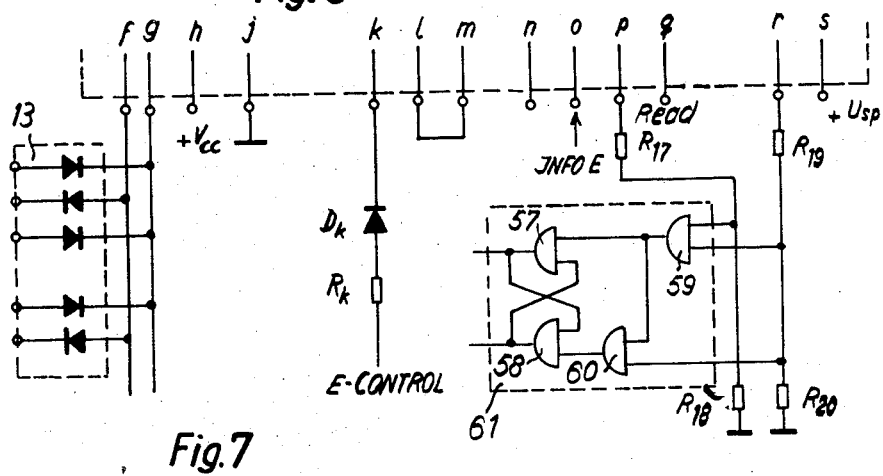
Fig. 6
Fig. 7

MODULAR REMOTE CONTROL AND SUPERVISORY SYSTEM SWITCHGEAR

The invention relates to a switchgear having a number of switching units which are combined according to the given switching functions and comprise command devices, switching devices and signalling devices.

Heretofore switchgears have been designed without exception according to the precise switching problems to be solved and individually manufactured, the different devices being mostly rigidly built into a board, e.g. of sheet metal, and wired. The wiring, i.e. the connection of the devices to the mains and their interconnection by means of control lines into switchgears was effected in principle by means of wiring diagrams, and it will be understood, when each switchgear and each of its particular devices and units is treated individually, that the establishment of the wiring diagrams and making of the connections requires quite a considerable amount of work, inasmuch as such work is liable to many possible mistakes and therefore requires a continuous checking. Though the wiring operation is facilitated by marked terminals and cable harnesses having marked conductors, such means do not substantially shorten the required working time, since each individual connection must be planned and effected.

An essential progress in the manufacture of switchgears has been realized by the introduction of the slide-in system in which individual switchboards are assembled from prefabricated slide-in units containing the various devices. Generally, prefabricated switch boxes are used to this end, which are each constructed for receiving a certain number of slide-in units. The switch boxes contain a system of mains or rails to which are connected the devices of the inserted slide-in units. The number and the types of switching units which may be combined are practically dependent only on the capacity of a switch box and on the system of its mains. The devices of the inserted slide-in units are connected in conventional manner by control lines to form switching units, predominantly by using marked terminals and cable harnesses. In the finished wired switchboards of this kind, modifications are possible, but difficult to effect, since already present control lines must be removed and replaced by new connections. With regard to wiring, the "slide-in type" switchboards present the same deficiencies as the "fixed" switch boards, but only to a lesser degree, since they concern only the control wiring, but not the mains.

The object of the invention is the provision of a switchgear in which no wiring plans are required for making the control connections and which may be assembled from prefabricated parts and combined with slide-in units which are not necessarily plug-in members, and may be rearranged and exchanged without requiring complicated changes in the control wiring.

The switchgear according to the invention comprises a plurality of switching units including command devices, switching devices and signalling devices combined according to given switching functions, each of the command devices and switching devices includes transmitters for delivering command signals determined by the operating conditions of said devices, each of the switching devices and signalling devices includes receivers for receiving command signals, said receivers having storage means for storing the received signals and evaluation means for evaluating the stored signals, a central unit for producing address signals in cyclic sequence, the same address signal being assigned to functionally correlated transmitters and receivers, and a control cable interconnecting a plurality of said transmitters and receivers and connecting said plurality of transmitters and receivers to said central unit, each of said transmitters and receivers being responsive to a definite address signal produced by said central unit.

Conveniently, the transmitters and receivers of the different command devices, switching devices and signalling devices comprise separate address units which are responsive each to a definite address of the addresses produced by the central unit, or may be adjusted to receive a definite address.

In order to design a switchgear according to the invention, it is only necessary to fix the number and type of the required command devices, switching devices and signalling devices and to establish an "address plan" according to which the desired switching units are assembled from the different devices, the address units of the devices being set to the addresses as indicated in the address plan. The conventional wiring diagrams used until now are replaced in the switchgear according to the invention by the address plans which are of substantially greater simplicity and clearness and the above mentioned drawbacks due to the wiring are avoided. It will be understood that in a certain switchgear the available command devices, switching devices and signalling devices can be used to assemble any desired switching units, by merely changing the addresses, and that further such devices can be added or removed without having to effect any wiring work.

In switchgears a considerable amount of safety in operation is required, i.e. the possibility of faulty switching must practically be excluded. In the switchgear according to the invention a satisfactory switching safety is obtained without any decrease of economical production possibilities, by providing the central unit with a signal generator for producing read-out signals having a duration which is smaller than the duration of an address signal, and the output of the read-out signal generator is connected by a read-out conductor with the receivers of the switch-gear, each such receiver comprising switching members which only then release the receiver for receiving a command signal, when it simultaneously receives the signals of its address and a read-out signal.

Conveniently, the duration of the read-out signal is chosen as short as possible, the time delays of the electronic units of the switchgear and the signal transit time in their conductors having to be considered. Since any external disturbing influences become effective in the switchgear only during the read-out time and thus can cause faulty switchings, the switching safety of the switchgear is substantially increased by the limitation of the read-out time to a minimum. For the further increase of the switching safety, the output of the read-out signal generator can be connected with the read-out conductor by a gate circuit having its control inputs connected to the outputs of a transmitter-control circuit and a receiver-control circuit, in order to block the passage of the read-out signals through the gate circuit, when the control inputs thereof receive a blocking signal from the transmitter control circuit and/or from the receiver control circuit. The control circuits can be conveniently so formed that they deliver blocking signals upon faulty address units of the transmitters and receivers, upon defective transmitters and receivers, and upon breaking of a lead, whereby the switchgear becomes so-to-say self-controlling.

In the following the invention is explained in detail with reference to the accompanying drawings, in which.

Figure 4:
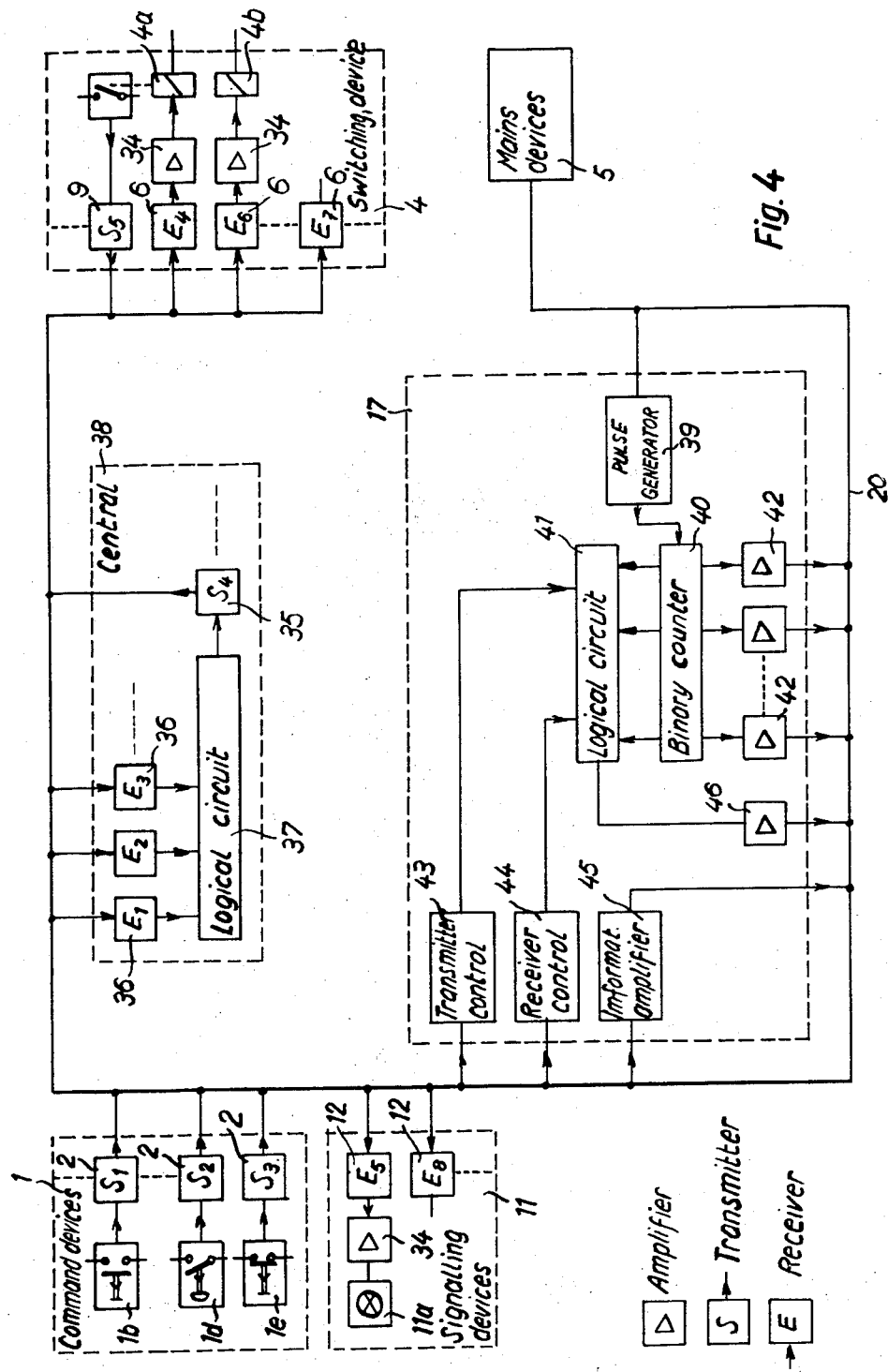
Figure 8:
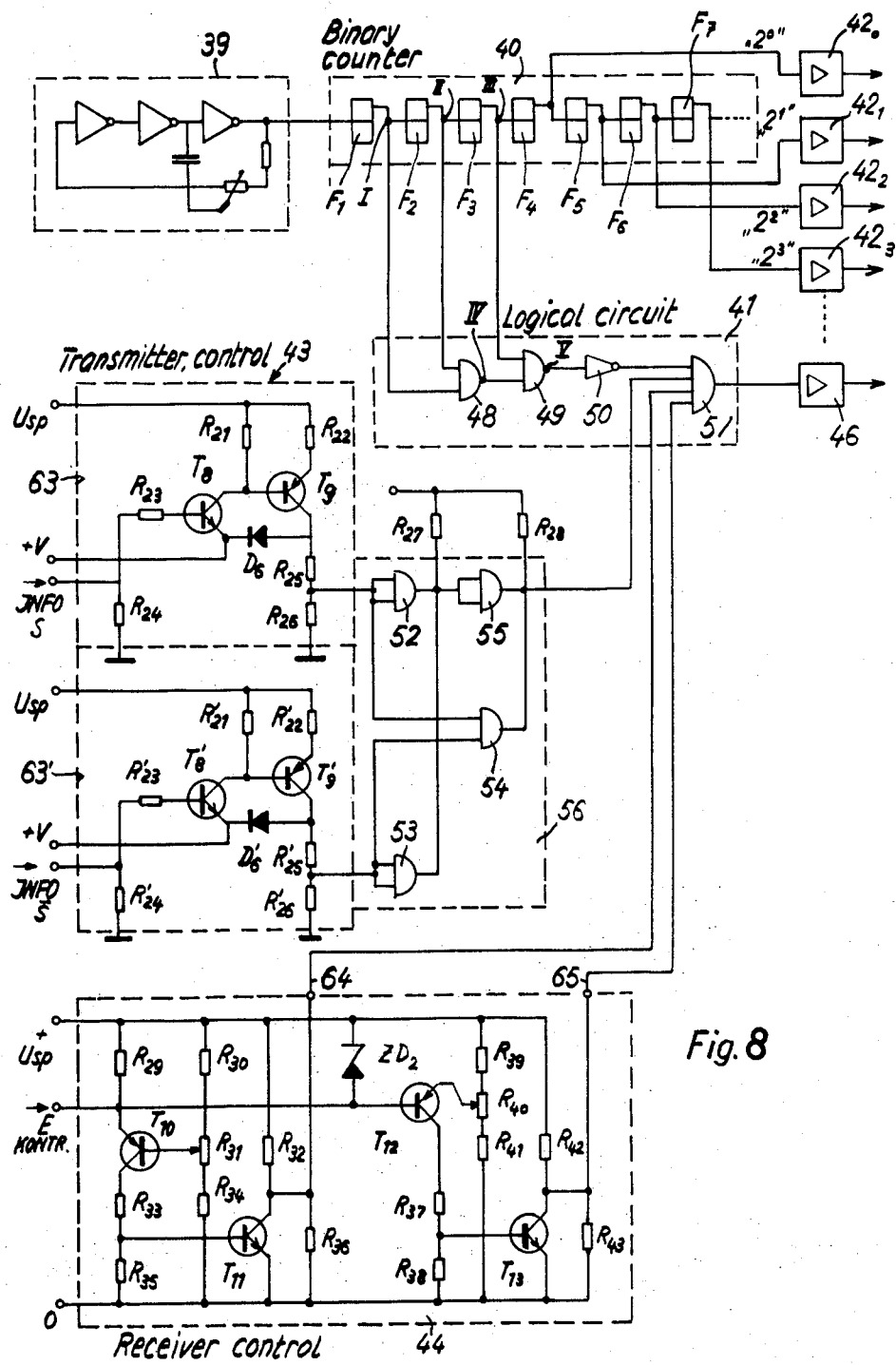
Figure 9:
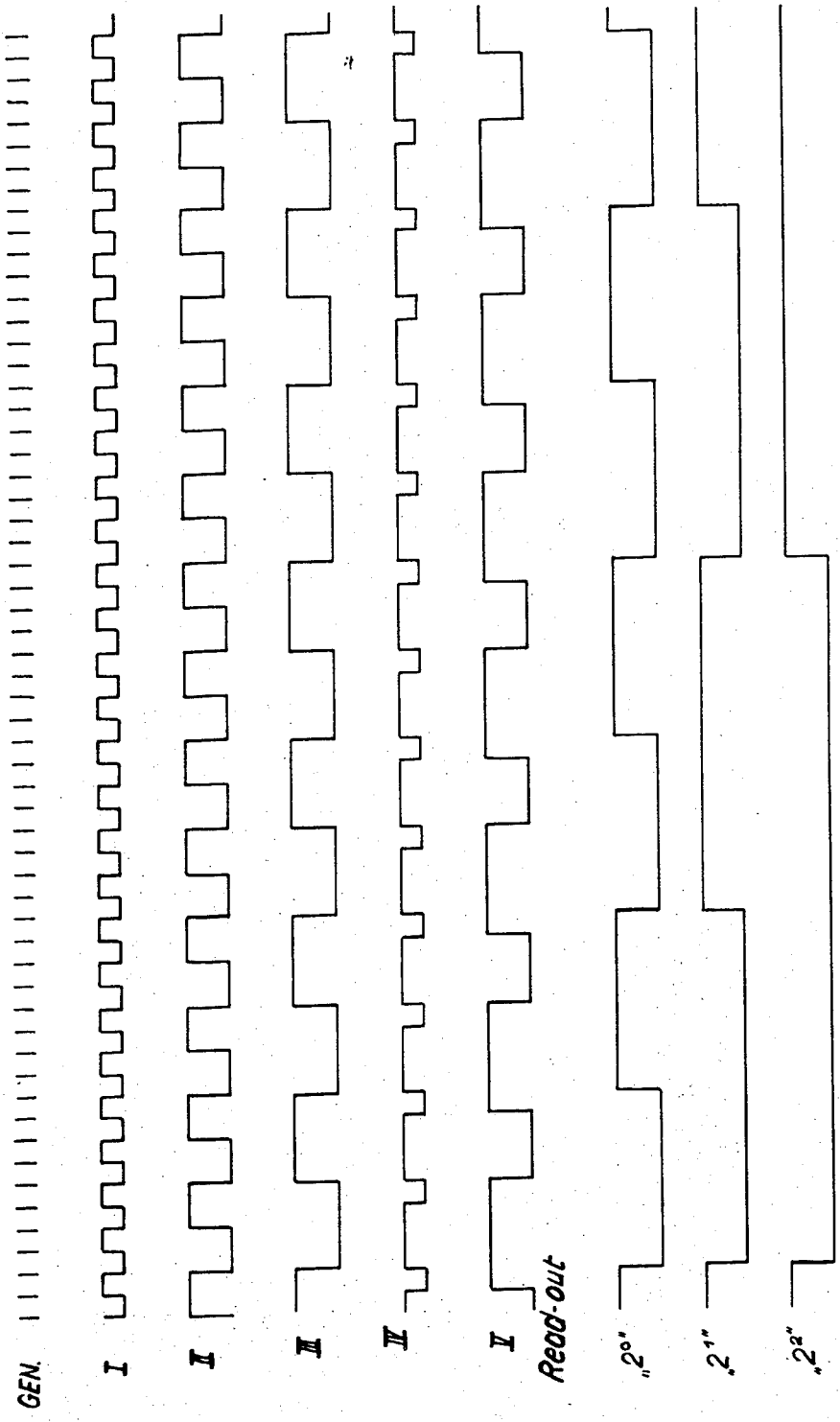
Figure 10:
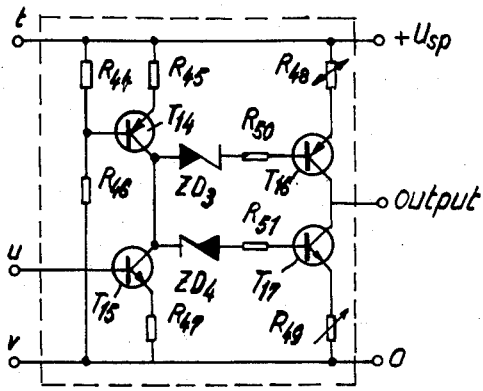
Figure 11:
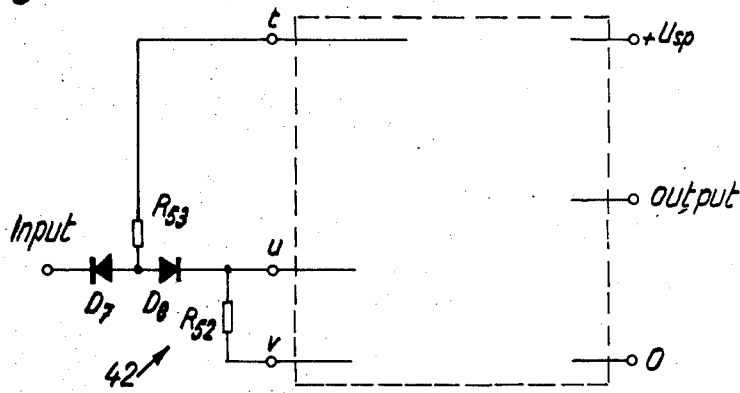
Figure 12:
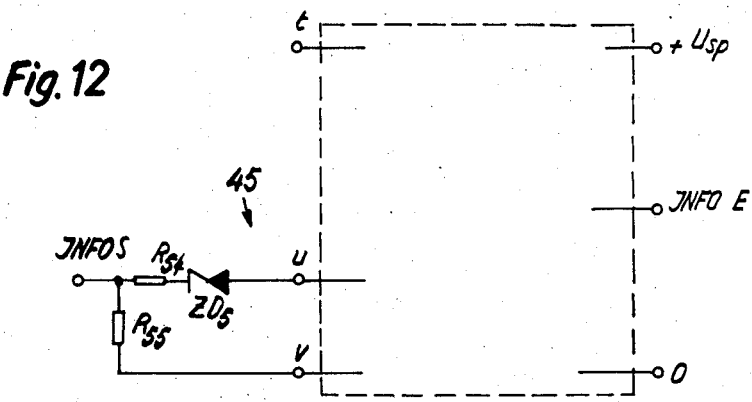

FIG. 4 shows in greater detail the principle of the construction of a switchgear according to the invention, FIG. 5 shows diagrammatically a basic circuit used for a transmitter and a receiver, FIG. 6 shows connections and terminals by which the basic circuit of FIG. 5 is completed to a transmitter, FIG. 7 shows connections and terminals by which the basic circuit of FIG. 5 is completed to a receiver, FIG. 8 shows diagrammatically the construction and the circuit of the central unit of the switchgear according to FIG. 4, FIG. 9 shows pulse sequences for read-out and address signals produced in parts of the central unit, FIG. 10 shows a basic circuit for different gain amplifiers of the switch gear, FIG. 11 shows connections and terminals by which the amplifier basic circuit of FIG. 10 is completed to an amplifier for the address and read-out signals, and FIG. 12 shows connections and terminals by which the gain amplifier basic circuit of FIG. 10 is completed to an amplifier for the command signals of the transmitters.

Figure 1:
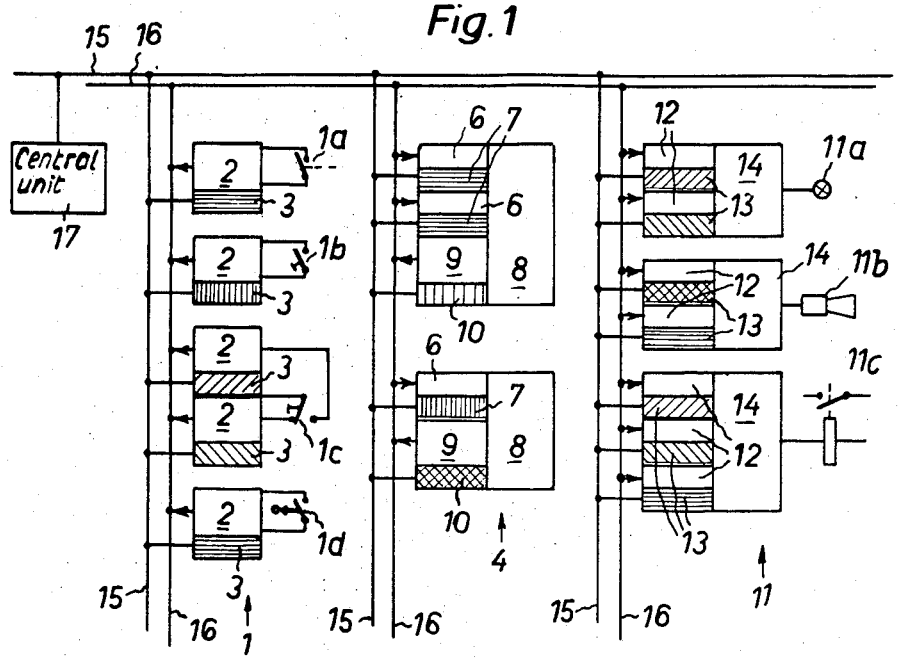
FIG. 1 shows the basic structure of the switchgear according to the invention in the form of a block diagram.

In the block diagram of FIG. 1, the numeral 1 designates command devices of a switchboard. Each command device contains a command member such as e.g. an auxiliary contact 1a, a key 1b, a switch 1c or a limit switch 1d, etc., by means of which member one or several switch gears and or signalling devices shall be switched on or off. The command members always contain one or several contacts with the operating positions "on" and "off" and which, according to the commands to be transmitted, are closed or opened. Each command device 1 comprises a number of transmitters 2 corresponding to its commands to be transmitted, which transmitters are controlled by the operating conditions of the command device contacts and produce corresponding command signals. An address unit 3 is inserted in the circuit before each transmitter 2, the address unit 3 being adjusted to a certain address, for example in the form of a definite pulse sequence and upon reception of this definite address pulse sequence releases the transmitter for delivery of the command signals.

Switching devices 4 contain as switching members predominantly contactors, whose coils may be connected for example by relays to a principal supply main line. The relays are controlled by the command signals of the transmitters for which purpose each switching device 4 contains a plurality of receivers 6 the number of which corresponds to the commands to be effected. An address unit 7 is inserted in the circuit before each receiver 6. The construction of the receiver-address units 7 preferably is identical with that of the transmitter-address units and their purpose is to "gate" the receivers for the reception of transmitter-command signals when the associated address units receive the address signals to which they are adjusted. Each receiver 6 further contains a storage member which stores the transmitter command signal received upon gating until the next following gating.

Each switching device 4 finally is provided with an evaluation member 8 which causes actuation of the switching members of the switching devices according to the stored command signals.

In switchgears usually not only the delivery of a switching command but also the execution of the same is indicated or signalled. It also frequently happens that the switching members of a switching device are controlled by those of a series connected switching device. When for example the contactor of a switching device shall respond with a time lag to a switching command, a thermal circuit braker, for example, is series connected ahead of the contactor switching device. The switching device with the thermal circuit breaker then receives the command signal and supplies this latter or another command signal with a delay to the contact switching device. Generally, the switching devices also will perform the functions of command devices, since they must also deliver a signalling or switching command. According to the commands to be delivered, each switching device 4 thus also contains a number of transmitters 9 which operate in the same manner as the transmitters 2 of the command devices and also may be constructed in like manner. The control device transmitters 9 contain address units 10 like those of the command devices 1, and the generation of their command signals is practically effected in the same manner as with the command devices. The means for generation of the command signals and for storage of the received signals are not separately shown in the switching devices 4, for the reason of simplicity, but they shall be considered to be contained in the blocks of the evaluation members 8.

The signalling devices 11 of the switchgear comprise the signalling members, such as e.g. pilot lamps 11a which, when connected into circuit, may blink in a fast or slow sequence, signalling horns 11b, or generally relays 11c for actuation of any other indicating members. Each signalling device 11 comprises a number of receivers 12 corresponding to the number of signals and return signals to be effected, which receivers can be constructed in like manner as the receivers 6 of the switching devices 4, i.e. which comprise an address unit 13 connected in series, means for storing the received command signals and an evaluator 14. By means of the evaluator 14 the signalling member of a signalling device is connected to or disconnected from the corresponding feed line in accordance with the stored command signals. The feed lines for the signalling members and the mains are not shown in FIG. 1, since they are installed and wired as usual in switchgears.

The address units 3, 7, 13 of all command devices, switching devices and signalling devices of the switchgear are connected to a common address conductor 15 and likewise the transmitters 2, 9 and the receivers 6, 12 of these devices are connected to a common signalling conductor 16. Conductors 15 and 16 are cables having plural address and signal conductors. The address conductor and the signalling conductor are combined to a control cable which passes in proximity of all device positions of the switchgear and comprises conventional means for the connection of the different devices. The address conductor 15 is fed from a central unit 17. The central unit 17 produces in a cyclic sequence all the different address signals used in the switchgear, so that in each cycle each address is called at least once. The combination of the individual devices to form switching units is effected by a corresponding assignment of definite addresses, as this is indicated for example in FIG. 1 by different hatching of the blocks representing the address units.

The construction of the central unit and of the address units, of the transmitters, receivers and evaluators depends on the transmitting methods used. All electrical transmitting methods known in telecontrol engineering can be used, the choice of a certain method being mainly determined by economical considerations. Predominantly, however, pulsing methods with coding will be selected. Also the number of wires of the control cable for the address and signalling line is dependent on the transmitting methods used, and particularly also on the used coding system.

The command devices, switching devices and signalling devices are built into slide-in units together with their transmitters, receivers and evaluators. The slide-in units can be manufactured easily in quantity production. It is convenient to produce the address units of the transmitters and receivers to be adjustable to a determined address or to provide exchangeable address blocks, so that any desired combinations of the slide-in units provided in the switchgear into switching units, as well as a transposition of the different slide-in units within the switch-gear is easily possible.

Figure 2:
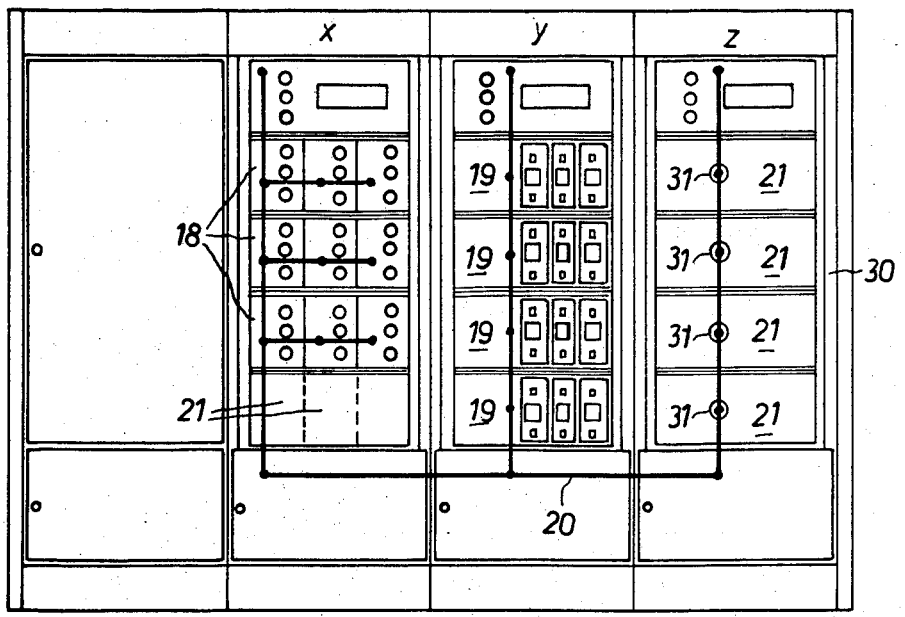
FIG. 2 shows a switchgear in elevation with the control cable interconnecting the different units.

FIG. 2 shows as a practical embodiment in diagrammatic manner a contactor cabinet having three panels X, Y, Z, the first of which is partially equipped with slide-in units 18 of a contactor type, and the second is fully equipped with slide-in units 19 of a second type of contactors. The third panel Z is empty and serves as reserve. The boxes for the slide-in units are produced in the usual manner and equipped with the mains. Instead of the known terminals provided for making the control connections and accommodated in separate shelves, the boxes, however, only contain a control cable 20 which comprises the address conductors and the signalling conductors and is passed over all shelves 21 provided for the slide-in units. The control cable is provided with connecting means 31 in each shelf 21 for the devices of the slide-in units which may be arranged for example as plug and socket connections, so that together with the insertion of a slide-in unit also the devices thereof are connected to the control cable. Any other wirings are not required and the wiring plans or wire lists required heretofore are, as mentioned, reduced to the assembly of addresses.

Figure 3B:
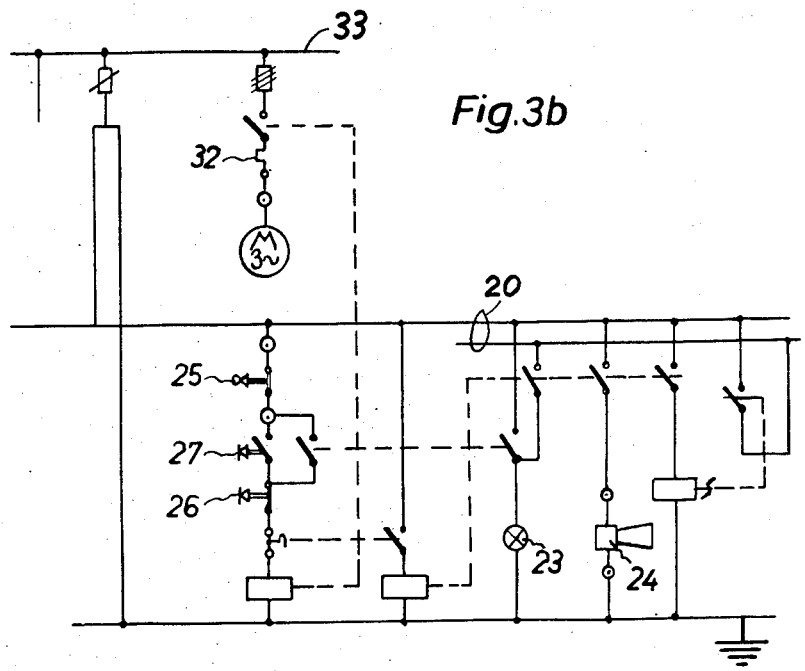
FIG. 3b shows a switching plan for the circuit arrangement of FIG. 3a, but in contrast with a conventional switchboard.
Figure 3A:
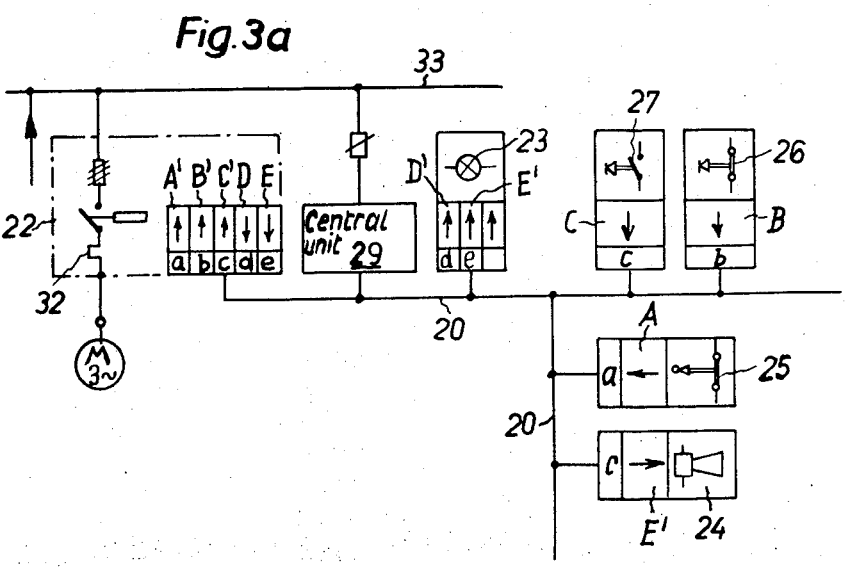
FIG. 3a is a block diagram for a simple circuit arrangement in a switchgear according to the invention.

A simple circuit example for a switchgear according to the invention is shown in FIGS. 3a and 3b. The contactor for a motor M is switched in and out of circuit by means of an in-key 27, an off-key button 26, a limit switch 25 and a thermal release 32. When the contactor is closed, a pilot lamp 23 lights up permanently, and when it is opened by the thermal release, the pilot lamp blinks and additionally a horn signal 24 operates. A conventional circuit diagram is shown in FIG. 3b. Here, the relatively greater number of control connections are to be considered and the rigidity of the circuit which practically does not admit any change in the functional assembly of the different devices. A switchgear constructed according to the above explanations for this purpose is shown diagrammatically in FIG. 3a and comprises a contactor slide-in unit 22 having the contactor and the thermal release 32 connecting the motor M to the mains 33; a signalling slide-in unit having a signalling lamp 23, a second signalling slide-in unit having a horn 24; a command slide-in unit having a limit switch 25; a second command slide-in unit having an off-key 26 and a third command slide-in unit having an on-key 27. According to the commands to be transmitted the command devices and the switching device comprise transmitters, namely the limit switch, the off-key and the in-key slide-in unit each comprise a transmitter A, B and C, respectively, and the contactor slide-in unit comprises two transmitters D, E, one of the transmitters A transmitting the signal "off" - "on" for the switching condition of the contactor, and the other transmitter E transmits the corresponding signal for the switch condition of the thermal release 32. The contactor slide-in unit 22 comprises a receiver A' for receiving the command signal transmitted by the limit switch A, a second receiver B' for the signal of the off-key slide-in unit 26 and a third receiver C' for the signal of the on-key transmitter C. The horn slide-in unit 24 comprises a receiver E' and the lamp slide-in unit 23 comprises receivers D' and E' for the continuous signal and the blink signal, the blink voltage being supplied separately, but with the same cable. The address units of the transmitters and receivers are designated by a, b, c, d and e. The various slide-in units further comprise the evaluators, the evaluator of the contactor slide-in unit 22 particularly contains an "AND"-gate circuit, by which the contactor is put in circuit only when an "on" signal is simultaneously applied to all three receivers A', B', C', and the contactor is switched-off when at least one receiver receives an "off"-signal. The slide-in units are connected to a common control cable 20, to the address conductor of which cable the address signals a, b, c, d, e are transmitted from a central unit 29. The central unit 29 produces successively and in cyclic sequence the signals for the different addresses a to e; the address signals, for example, may be pulse sequences. It shall be supposed that the contacts of the off-key 26 and of the limit switch 25 are closed and the on-key 27 has just been actuated, so that the transmitters of these slide-in units would emit an "on" signal. When the address signal a appears, the transmitter A of the limit switch slide-in unit 25 and the "A" of the contactor slide-in unit 22 are gated, so that the "on"-signal transmitted by the transmitter A is received by the receiver A' and stored. With the next address signal b and the following address signal c, also the transmitters B and C of the off-key slide-in unit 27 and of the on-key slide-in unit 27, and the associated receiver B' and C' are gated in the contactor slide-in unit 22. All three receivers A', B', C' thereby receive "on" signals and the evaluator of the contactor slide-in units puts the contactor and accordingly the motor in circuit. With the subsequent address d the contactor-transmitter D and the receiver D' of the lamp slide-in unit 23 are gated and the pilot lamp is lighted. The contactor-transmitter E furnishes an "off"-signal, since the thermal release is switched off. With the last address e the transmitter E and the receiver E' of the lamp and horn slide-in units are gated, but since the received signal is an "off"-signal no further switching operation is effected. The signal storage devices in the receivers and transmitters take care that this switching and signalling condition is maintained during the successive address cycles until any command modification is effected. When now, for example, the off-key 26 is actuated, its transmitter B supplies an "off"-signal which, upon appearance of the address b in the address conductor, arrives at the receiver B' of the conductor slide-in unit and effects dropping out of the contactor. Due to dropping of the contactor the signal of the transmitter D is changed from "on" to "off"-signal arrives with the call of the address d to the lamp receiver D' and effects axtinction of the pilot lamp. When the thermal release 32 cuts out the contactor, upon actuation of the in-key, the contactor transmitter E supplies an " on"-signal which arrives at the address e on the receivers E' of the lamp and horn slide-in units and effects blinking of the lamp with a simultaneous sounding of the horn. The control cable, with this construction of the switchboards, has only the purpose to feed all address and command signals to all slide-in units. The functional combination of the slide-in units is exclusively effected by the distribution of addresses.

For the laying of the control cable or of the individual conductors thereof, different variations are possible, according to the particular requirements of a certain transmission system. Thus, when e.g. the signals emitted by the transmitters must be amplified, the signalling conductor 16 of the control lever can be passed through the central unit 17, and this latter can contain a corresponding amplifier.

The provision of at least one central unit for a switchboard and the equipment of the slide-in units with transmitters, receivers, address units and evaluators denotes, particularly with large switchboards having many command devices, switchgears and signalling devices, only an apparent greater constructional volume with respect to the known switchboards. All these additional structural parts can be manufactured economically in series production and furnished from stock.

The block diagram of the switchgear shown in FIG. 4 corresponds substantially to that of FIG. 1 but with respect to the latter it shows more details. For facilitation of inspection, there are concentrated in FIG. 4 command devices 1a, 1b . . . , such as e.g. a normally open contact 1b, a limit switch 1d and a normally closed contact 1e, in a block 1 designated "command devices," switching devices 4a, 4b . . . , e.g. contactors, in a block 4, designated "switching devices," and signalling devices 11a, 11b . . . , e.g. luminous indicators 11a, in a block 11 designated "signalling devices." The transmitters 2 of the command devices, transmitter 9 of the switching devices and intermediate transmitter 35 are designated by $S_1, S_2, S_3$ . . . , and the receivers 6 of the switching devices, receiver 12 of the signalling devices and intermediate receivers 36 are designated with $E_1, E_2, E_3$ . . . . The address units in the transmitters S and receivers E are marked by the index numerals, cooperating transmitter- receiver pairs having the same index numerals.

The intermediate receivers 36 and intermediate transmitters 35, together with a logical circuit 37 are combined in a block 38 "central." The connections for the desired combination of devices in the respective switchgear are made in the central 38 by means of the logical circuit 37. The outputs of the intermediate receivers 36 are connected by means of gate circuits of the logical circuit 37 with intermediate transmitters 35, so that an intermediate transmitter 35 is energized, when corresponding output signals are present at the intermediate receivers 36 of the logical circuit associated therewith. The allocation is effected, as mentioned, by address signals.

In the block diagram shown in FIG. 4, the command devices 1b, 1d and 1e (switches) are connected to the receiver $E_4$ of a contactor 4a by transmitters $S_1, S_2$ and $S_3$, the intermediate receivers $E_1, E_2$ and $E_3$, the logical circuit 37 and the intermediate transmitter $S_4$; the contactor 4a shall be energized by the limit switch 1d only then, when simultaneously the normally open contact 1b and the normally closed contact 1e are actuated. For this case an AND-gate would have to be provided as logical circuit. The connection of different devices is effected directly and not via the central 38. Thus, e.g. the transmitter $S_5$ in FIG. 4 marking the switching condition of the contactor 4a is connected directly, i.e. without interposition of intermediate receiver and intermediate transmitter, with the receiver $E_5$ of the signal lamp 11a.

For the control of the switching devices 4 and the signalling devices 11 by the signals of their receivers 6 and 12, respectively, generally gain amplifiers 34 are required, which are connected between the receivers and the switching devices or signalling devices.

The transmitters S and receivers E are interconnected by means of a common multi-conductor control cable 20 and connected to the central unit 17. The control cable 20 further contains conductors carrying the operating voltages of the different circuits and devices of the switchgear, which voltages are supplied by mains units 5.

The central unit 17 comprises a pulse generator 39 for producing timing pulses from which are derived the address signals and a signal "read-out." The output of the pulse generator 39 is connected to a binary counter 40 and this latter to a second logical circuit 41. In the represented example, the binary counter 40 consists of a series of flip-flops whose outputs successively supply pulse sequences, each sequence of the succession having a frequency which is the double of that of the preceding sequence. The signal "read-out" is derived from the pulse sequences of some of these flip-flops, and from the pulse sequences of the other flip-flops there are assembled the addresses, as will be described later in greater detail. The pulses of the "address" flip-flops are amplified in amplifiers 42 and supplied to the address conductors of the control cable 20.

The outputs of the "read-out" flip-flops of the binary counter 40 are connected to the logical circuit 41 which forms the signal "read-out" from the pulse sequences of these "read-out" flip-flops. The read-out signal is amplified in the amplifier 46 and supplied to the read-out conductor in the control cable 20. The central unit 17 further comprises a circuit "transmitter-control" 43 and a circuit "receiver-control" 44. The outputs of the control circuits 43 and 44 are connected to the logical circuit 41 which comprises gate circuits feeding the signal "read-out" only then to the amplifier 46, when the transmitter-control 43 and the receiver-control 44 have ascertained correct functioning of the transmitter and receiver called up via an address.

Each transmitter S transmits, for the duration of its address, its information "off" or "on" and "O"or "L" via a signalling conductor of the control cable 20, an information amplifier 45 connected thereto, and a second information conductor, to the receivers E of the switchgear. In order to enable a simple control of the operational efficiency of the transmitters S, these latter are so constructed that each transmitter transmits its signal in the form of a direct signal (Info S) and of an inverse signal (Info $\bar{S}$). The two signals Info S and Info $\bar{S}$ are compared with each other in the transmitter control 43. If the two input signals of the transmitter control 43 are not direct and inverse signals, the delivery of the read-out signal is blocked in the logical circuit 41.

A receiver E called up by its address responds, during the duration of its address, to the information of its associate transmitter only in the time period determined by the read-out signal. The time of reading determined for example by the pulse duration of a read-out pulse signal, is chosen as short as possible in order to substantially reduce the susceptibility of the switchgear to electrical disturbances, as already mentioned, since only the latter can cause faulty switching operations during the time of reading.

Errors occurring in a receiver and/or in its address unit become apparent in that no receiver responds to an address or that simultaneously two (or more) receivers are responding. Should this happen, then the receiver control 44 blocks the delivery of the read-out signals in the logical circuit 41.

Thus, in the read-out conductor leading to the receivers E, read-out signals occur only then when the switchgear is in order. Owing to these two means, i.e. blocking of the read-out signals upon any defect occurring in the transmitters, receivers and address units, as well as reducing the reading time to the utmost possible minimum, the safety of the switchgear is guaranteed.

Each transmitter S and receiver E comprises a basic circuit which is the same for all transmitters and receivers and which can be made as a thick-film integrated circuit; they further comprise a transmitter additional circuit, and a receiver additional circuit respectively, which additional circuits, when connected to the respective basic circuit make this latter to a receiver and to a transmitter, respectively, and an address unit which also can be connected to the basic circuit and which may be assembled from a series of diodes.

FIG. 5 diagrammatically shows the construction of the basic circuit 62 which may be e.g. executed as a printed circuit. This basic circuit comprises a conductor board of which carries terminals $f, g, \ldots s$, and which consists of two parts, namely the address portion for decoding of the address, and the main portion. The supply voltage $+U_{sp}$ of 12 volts is fed to the basic circuit 62 by the terminal $s$. The terminals $f, g, h$ and $j$ are provided for the address portion. As shown in FIG. 6 and FIG. 7, the address units 3, 13 of the transmitters and the receivers are connected to the terminals $f, g$. The terminals $j$ in operation carries zero-potential and to the terminal $h$ a voltage of +5 volts is applied. In particular, the address portion comprises two n-p-n transistors $T_1$ and $T_4$ and two p-n-p transistors $T_2$ and $T_3$. The thresholds of the transistors $T_1$ and $T_3$ are situated in the range of from 5 to 6 volts.

The base of the first n-p-n transistors $T_1$ is connected to the terminal $f$ and by a resistor $R_1$ to the supply terminal $s$. Its emitter is connected to the terminal $h$ and its collector is connected by a resistor $R_3$ to the terminal $s$. The base of the first p-n-p transistor $T_2$ is applied to the collector of $T_1$, its emitter is applied by a resistor $R_4$ to the supply voltage and its collector is connected by a diode $D_1$ to the emitter of $T_1$ and by a diode $D_2$ to the emitter of the second p-n-p transistor $T_3$. The base of this second p-n-p transistor $T_3$ is connected to the terminal $g$ and moreover by a resistor $R_2$ to the terminal $j$. In the same manner the collector of this transistor $T_3$ is connected by a voltage divider formed of the resistor $R_5$ and $R_6$ to the terminal $j$. The base of the second n-p-n transistor $T_4$ is situated at the junction point of the two voltage divider resistors $R_5$ and $R_6$, the emitter of this transistor is connected to the terminal $j$ and its collector is connected by the resistors $R_7$ and $R_8$ with the terminal $s$.

The addresses are applied in the form of logical signals O and L to the address units 3 and 13 (FIGS. 6 and 7). When all diode inputs of the transistor $T_1$ show the signal L and all diode inputs of the transistor $T_3$ the signal O, then the four transistors $T_1 \ldots T_4$ are conductive, i.e. the address indicated in the central unit conforms with that of the transmitter and of the receiver. The collector of the transmitter $T_4$ is connected to the terminal $k$ and the junction point of the collector-voltage divider $R_7, R_8$ to the terminal $l$.

The main portion of the basic circuit 62 consists of one n-p-n transistor $T_5$ and two p-n-p transistors $T_6$ and $T_7$. The emitter of the n-p-n transistor $T_5$ is connected by a diode $D_3$ to the terminal $m$, the base by resistors $R_{11}$ and $R_{14}$ to the terminals $o$ and $n$, respectively, and the collector by voltage dividers $R_{10}$ and $R_9$ to the terminal $s$. The base of the first of the two p-n-p transistors $T_6$ is connected to the junction point of the voltage divider resistors $R_9, R_{10}$, the emitter of this transistor is connected to the terminal $s$ and its collector to the terminal $r$. The emitter of the second p-n-p transistor $T_7$ is connected to the terminal $s$ and the collector to the terminal $r$. The base of this transistor $T_7$ is connected by a resistor $R_{13}$ to the terminal $s$ and by a Zener diode $ZD_1$ and a diode $D_5$, and a further diode $D_4$ to the terminal $q$, as well as by a resistor $R_{12}$ to the terminal $k$, i.e. to the collector of the last transistor $T_4$ of the address portion.

In order to produce a transmitter from this basic circuit 62, the terminals k and m are connected with each other, so that also the emitter of the first transistor $T_5$ of the main portion of the basic circuit 62 is connected by the diode $D_3$ with the collector of the last transistor $T_4$ of the address portion. As FIG. 6 further shows, the terminals p and q are led to a separate output, from which in operation the direct information signal "Info S" is delivered. The inverse information signal Info $\bar{S}$ is obtained at the output r. When the transmitter is used in the central 38, then the corresponding micrologic 47 of the logical circuit 37 is connected to the terminal n, i.e. connected by the resistor $R_{14}$ with the base of the transistor $T_5$; in the other case, when the transmitter is used as a command device or a switching device the respective command or switching element is connected to the terminal o, which, besides, is connected to the terminal h. As an example, FIG. 6 shows a normally open contact device 1b, one contact of which is connected to the negative pole of a voltage source and its other contact by a voltage divider having resistors $R_{15}$ and $R_{16}$ to the positive pole of this voltage source. The center tap of this voltage divider $R_{15}$, $R_{16}$ is connected to the terminal o. The last transistor $T_4$ of the address portion controls the emitter current of the first transistor $T_5$ of the main portion, so that when the transistor $T_5$ is conductive, a current flows only then when the transistor $T_4$ is conductive, i.e. when in the address portion the correct address for the transmitter is present. The transistor $T_5$ becomes conductive when a signal voltage of a switching element, e.g. the normally open contact 1b or the micrologic 47, is applied to its base resistor $R_{11}$ or $R_{14}$. When the transistor $T_5$ is conductive, also the second transistor $T_6$ of the main portion is conductive, which transistor then delivers a signal via the terminal p to the transmitter output "Info S." The third transistor $T_7$ of the main portion delivers the inverse information signal. The transistor $T_7$ is blocked when, with the transistor $T_4$ of the address portion being conductive, the transistor $T_6$ is conductive. In this case a signal L is present at the transmitter output "Info S" and the inverse signal O at the output "Info $\bar{S}$." When the transistor $T_6$ is blocked, the transistor $T_7$ is conducting as soon as the transistor $T_4$ is conducting upon occurrence of the correct address for the transmitter, at the transmitter output "Info S" then appearing the signal O, and at the transmitter output "Info $\bar{S}$" the inverse signal L.

In order to produce a receiver from the basic circuit 62 in FIG. 5 the terminal l is connected with the terminal m, as shown in FIG. 7, and the terminals p and r obtain each a voltage divider consisting of resistors $R_{17}$ and $R_{18}$, and $R_{19}$ and $R_{20}$, respectively, which are grounded. A circuit designated hereafter "D - RS - flip-flop" 61, is connected to the center taps of the voltage dividers, which circuit controls the receiver amplifier 34 (FIG. 4) via two outputs. The D - RS - flip-flop will be described later in more detail. The terminal k is connected by a diode $D_k$ and a resistor $R_k$ with the receiver control circuit 44 (FIG. 4). In operation the information signal "Info E" supplied by the information amplifier 45 (FIG. 4) is delivered to the terminal o, and the signal "read-out" supplied by the amplifier 46 for read-out signals (FIG. 4) is delivered to the terminal q.

The D-RS-flip-flop 61 comprises a storage- or memory element consisting of two N-AND-gates 57 and 58, the two inputs of this element being connected each to a further N-AND-gate 59 and 60, respectively. The two further N-AND-gates 59 and 60 have each two inputs, the two first ones being both connected to the center tap of the voltage divider $R_{19}$, $R_{20}$ itself connected to the terminal r. The second input of one of the further N-AND-gates 59 is connected to the center tap of the voltage divider $R_{17}$, $R_{18}$ connected to the terminal p, and its output is connected to the second input of the other one of the further N-AND gate 60.

When an L-signal forming an "Info E" signal appears at the terminal o, then the transistor $T_5$ and with it also the transistor $T_6$ in the main portion of the basic circuit 62 are conductive when the receiver receives its address, i.e. when also the transistor $T_4$ of the address portion of the basic circuit 62 is conductive. When an L-signal forming a read-out signal appears at the terminal q, then the transistor $T_7$ of the main portion of the basic circuit 62 is conductive.

When the transistors $T_6$ and $T_7$ are conductive, the center taps of the voltage dividers $R_{17}$, $R_{18}$ and $R_{19}$, $R_{20}$, which are connected by the terminals p and q with the collectors of these transistors, have a potential corresponding to an O-signal. When the transistors $T_6$ and $T_7$ are blocked the two center taps have a potential corresponding to an L-signal.

The memory element of the D-RS-flip-flop 61 consisting of the two N-AND-gates 57 and 58 is switched in or remains switched in, when upon reception of a read-out signal (i.e. transistor $T_7$ becomes conductive) the transistor $T_6$ is conductive. The memory element of the D-RS-flip-flop is switched off or remains switched off when upon reception of a read-out signal the transistor 6 is non conductive. The memory element, accordingly remains switched off (or switched in) so long until the transistor $T_6$ being conductive, also the transistor $T_7$ becomes conductive by a received read-out signal (or the transistor $T_6$ being non conductive the transistor $T_7$ becomes conductive by a received read-out signal).

The above described circuits for the transmitters and the receivers of the switchgear essentially offer the following advantages:

In the basic circuit common to a transmitter and to a receiver no switching elements are present, which are not utilized for the transmitter as well as for the receiver.

The tresholds of the transistors $T_1$, $T_3$ and $T_5$ in the basic circuit are in the range of from 5 to 6 volts.

Cheap transistors may be used and the resistors may have a relatively high tolerance, which is of particular importance for thick-film circuits.

The current consumption of the transmitters and receivers in their non selected condition amounts to about 0.2 mA or less, and only the selected transmitters and receivers load (+ 12 volts) the information and reading conductors of the switchgear. Only minor requirements are made to the voltage supply source (+ 12 volts) with regard to performance and voltage stability. Finally, owing to the increased input impedance the stages for supplying the address units can be made cheaply.

FIG. 8 shows a preferred example of execution for the central unit 17 of FIG. 4. The binary counter 40 consists of a chain of series connected flip-flops $F_1$, $F_2$ . . . The first three flip-flops $F_1$, $F_2$, $F_3$ are used to set the moment of reading, i.e. the acceptance of the transmitter information by the receiver and the duration of transmission, and the remaining flip-flops of the binary counter serve for producing the address signals.

The pulse sequences delivered by the binary counter and combined in the logical circuit are represented in FIG. 9. The pulse generator 39 (FIG. 4) supplies a sequence of timing pulses which are designated by "-Gen" in FIG. 9, to the first flip-flop $F_1$ of the binary counter 40. The first flip-flop $F_1$ supplies a sequence of rectangular pulses which are designated in FIG. 9 by I, to the second flip-flop $F_2$ and to the logical circuit 41. A pulse sequence II (FIG. 9) having a pulse frequency of one half with respect to the pulse sequence I of the first flip-flop appears at the output II of the second flip-flop $F_2$. This second pulse sequence is fed to the third flip-flop $F_3$ and to the logical circuit 41. The third $1F_3$ produces at its output III a pulse sequence III which again has one half of the pulse frequency of the pulse sequence II of the preceding flip-flop $F_2$, and which is fed to the fourth flip-flop $F_4$ and to the logical circuit 41. The output pulse sequence of the fourth flip-flop $F_4$ is designated in FIG. 6 by "$2^0$," that of the fifth flip-flop $F_5$ by "$2^1$" and that of the sixth flip-flop $F_6$ by "$2^2$" etc. Each of these pulse sequences has one half of the pulse frequency of that of the preceeding sequence in the succession, and is supplied to an amplifier $42_0$, $42_1$, $42_2$ . . . , which feeds them in amplified condition into the address conductors of the control cable 20 (FIG. 4).

The pulse sequences I and II (FIG. 9) of the two first flip-flops $F_1$ and $F_2$ are supplied to the two inputs of an N–AND-gate 48 of the logical circuit 41. The output IV of the N–AND-gate 48 which supplies the pulse sequence IV of FIG. 6, is connected to one input of a second N–AND-gate 49, the second input of which is connected to the output III of the third flip-flop $F_3$. The output V of the second N–AND-gate 49 furnishes the pulse sequence V "read-out" shown in FIG. 9, which sequence is a combination of the pulse sequences III and IV. The output V of the second N–AND-gate 49 is connected by an inversion element 50 to one input of a third N–AND-gate 51 having four inputs to the output of which is connected the read-out signal amplifier 46. Two other of the four inputs of the third N–AND-gate 51 are connected to the circuit receiver control 44, and the fourth input is connected with the output of the circuit transmitter-control 43 by an exclusive OR (EITHER-OR) gate 56.

The transmitter-control 43 comprises two matching circuits 63, 63', one for the direct information signal "Info S" and one for the inverse information signal "Info $\overline{S}$" of the transmitters. Both matching circuits 63, 63' are of equal construction. The base of a n–p–n transistor $T_8$ is grounded by a voltage divider of resistors $R_{23}$ and $R_{24}$. The input for the transmitter signals "Info S" and "Info $\overline{S}$" is connected to the center tap of the voltage divider $R_{23}$, $R_{24}$. The collector of the n–p–n transistor $T_8$ is connected to the base of a p–n–p transistors $T_9$. Both, the base of the transistor 9 and the collector of the transistor 8 are connected by a resistor $R_{21}$ to the positive terminal $U_{sp}$ (+ 12 volts) of the supply voltage source, to which also the emitter of the transistor $T_9$ is connected by a resistor $R_{22}$. The collector of the p–n–p transistor $T_9$ is connected over a diode $D_6$ to the emitter of the n–p–n transistor $T_8$ and is grounded over a voltage divider having the resistors $R_{25}$ and $R_{26}$. The output terminal of the matching circuit is connected to the center tap of the voltage divider $R_{25}$, $R_{26}$. The emitter of the p–n–p transistor $T_8$ receives the threshold voltage (+5 volts) from the terminal + V.

The exclusive OR (EITHER-OR) gate 56 consists of four N–AND-gates 52, 53, 54 and 55. The output of the matching circuit 63 for the direct transmitter signal "Info S", i.e. the center tap of the collector-voltage divider $R_{25}$, $R_{26}$ is connected to both inputs of the first N–AND-gate 52 and to one input of the third N–AND-gate 54. The output of the matching circuit 63' for the inverse information signal "Info $\overline{S}$," i.e. the center tap of the collector-voltage divider $R'_{25}$, $R'_{26}$ is connected to both inputs of the second N–AND-gate 53 and to the other input of the third N–AND-gate 54. The outputs of the first and second N–AND-gates 52 and 53 are connected in common to both inputs of the fourth N–AND-gate 55 and by a resistor $R_{27}$ with the +5 volts conductor (threshold) voltage). The two outputs of the third and the fourth N–AND-gates 54 and 55 are connected with one another and by a resistor $R_{28}$ with the +5 volts conductor, and they form the output of the gate 56, which output is connected to the fourth input of the N–AND-gate 51 of the logical circuit 41.

The gate 56 only then delivers a gating signal to the N–AND-gate 51 of the logical circuit, when a direct and an inverse signal "Info S" and "Info $\overline{S}$" are applied simultaneously to the input of the transmitter-control 43.

The receiver-control 44 has the purpose, as already mentioned, to ascertain whether always only one single receiver has responded. When a receiver responds, then the transistor $T_4$, FIG. 5 and FIG. 7 becomes conductive. A resistor $R_K$ is connected by a diode $D_K$ to the collector of this transistor $T_4$, the resistor being connected to the receiver-control conductor "E-control." The receiver-control conductor is connected to the input of the receiver-control circuit 44 (FIG. 8). When no receiver at all has responded, the voltage drop at the control resistance $R_K$ is practically zero, when a single receiver responds then the voltage drop at the control resistance has a definite, relatively low value, when more than one receiver responds, then the voltage drop at the control resistor $R_K$ is correspondingly higher. The receiver control circuit 44 is responsive correspondingly to these three values of the input signal.

The receiver control circuit 44 shown by way of example in FIG. 8 consists of two circuit portions. The first circuit portion is a two-stage transistor amplifier. The emitter of a p–n–p input transistor $T_{10}$ is connected to the input terminal for the connection of the receiver control conductor "E-control." The input transistor $T_{10}$ is connected in basic circuit with an emitter resistor $R_{29}$, an adjustable base-voltage divider $R_{30}$, $R_{31}$, $R_{34}$ and a fixed collector-voltage divider $R_{33}$, $R_{35}$. The base of a n–p–n output transistor $T_{11}$ is connected to the center tap of the collector voltage divider $R_{33}$, $R_{35}$, the collector of the transmitter being connected by a resistor $R_{32}$ to a conductor carrying the positive operating voltage $U_{sp}$. The collector-emitter path of the output transistor $T_{11}$ is bridged by a load resistor $R_{36}$ which is connected over a first output terminal 64 with the third input of the N–AND-gate 51 of the logical circuit 41.

The second circuit portion of the receiver control 44 also comprises a p–n–p input transistor $T_{12}$ having an adjustable emitter voltage divider $R_{37}$, $R_{38}$ whose center tap is connected to the base of an n–p–n output transistor $T_{13}$. The collector of the output transistor $T_{13}$ is connected by a collector resistor $R_{42}$ to the conductor carrying the operating voltage $+U_{sp}$. Its emitter-collector path comprises a load resistor $R_{43}$, which is connected to the fourth input of the N–AND-gate 51 of the logical circuit 41 by a second output terminal 65. The base of the input transistor $T_{12}$ of this second circuit portion is connected to the input terminal for "E-control" and by a Zener diode $ZD_2$ to the $U_{sp}$-conductor.

The receiver control circuit 44 supplies gate signals by the load resistors $R_{36}$ and $R_{43}$ to the third and fourth input of the N–AND gate 51, when a voltage drop produced at the control resistor $R_K$ by response of a single receiver, is applied to the input of the circuit. When the voltage drop is zero, i.e. when none of the receivers responds, the load resistor $R_{36}$ of the first circuit portion supplies a blocking signal to the third input of the N–AND-gate 51; when a voltage drop appears at the input, caused at the control resistor $R_K$ by response of at least two receivers, the load resistor $R_{43}$ of the second circuit portion supplies a blocking signal to the fourth input of the N–AND-gate 51.

The N–AND-gate 51 accordingly lets pass a read-out signal to the read-out signal amplifier 46 only when the circuit arrangement of transmitter and receiver is in order.

The central unit 17 (FIG. 4) further contains the load amplifiers 42 and 46 which feed the address signals and the read-out signals in amplified condition into the address conductors and the read-out conductor, and the information amplifier 45 for amplifying of the information signals delivered by the transmitters.

Preferred embodiments of these amplifiers are shown by the circuits of FIGS. 10, 11 and 12.

All these amplifiers 42, 46 and 45 again have the same basic circuit which is diagrammatically represented in FIG. 10.

The basic circuit essentially represents a push-pull amplifier having a p–n–p transistor $T_{14}$ and a n–p–n transistor $T_{15}$ in the input circuit, the emitters of these transistors being each connected by a fixed resistor $R_{45}$ and $R_{47}$, respectively, to the $+U_{sp}$ terminal and the O terminal, respectively, for the operating voltage, e.g. of 12 volts. The collectors of the two input transistors $T_{14}$ and $T_{15}$ are connected together and by a Zener-diode $ZD_3$ and a resistor $R_{51}$ they are connected with the base of a p–n–p output transistor $T_{16}$, as well as by a Zener-diode $ZD_4$ which is antiparallel connected relative to the first mentioned Zener-diode $ZD_3$, and a resistor $R_{51}$ with the base of a n–p–n output transistor $T_{17}$. The emitters of the two output transistors $T_{16}$ and $T_{17}$ are connected by PTC-resistors $R_{48}$ and $R_{49}$ to the $+U_{sp}$ and O-terminals, respectively, of the operating voltage. Their two collectors are connected to an output terminal "output." The base of the p–n–p input transistor $T_{14}$ is connected to the center tap of a voltage divider inserted between the terminals $+U_{sp}$ and O. The base of the n–p–n input transistor $T_{15}$ is connected to an input terminal $u$. The circuit of FIG. 10 further shows a terminal $t$ connected to the $+U_{sp}$-terminal, and a terminal $v$ connected to the O-terminal.

This basic circuit is completed to an amplifier 42 for the address signals and to an amplifier 46 (FIGS. 4 and 8) for the read-out signals, when, as shown in FIG. 11, the terminal $v$ is connected by a resistor $R_{52}$ to a terminal $u$ and this latter by two oppositely series connected diodes $D_8$ and $D_7$ to an input terminal "input," and the junction point of the two diodes $D_7$ and $D_8$ is connected by a resistor $R_{53}$ to the terminal $t$.

In order to obtain from the basic circuit of FIG. 10 an amplifier 45 for amplifying the information signals "Info S," as shown in FIG. 12, the base of the p–n–p input transistor $T_{15}$, i.e. the terminal $u$ is connected by a Zener-diode $ZD_5$ and a resistor $R_{54}$, and the terminal $v$ by a resistor $R_{55}$ with an input terminal to which the conductor of the control cable 20 carrying the transmitter information "Info S" is connected. The amplified information signals "Info E" arrive by corresponding conductors of the control cable 20 to the input terminals $o$ of the receivers (FIG. 7).

Also the last described circuits, transmitter control circuit 43, receiver-control circuit 44 and the gain amplifiers 42, 45, 46 are so constructed, that the advantages enumerated in the description of the transmitters and receivers are fully valid, i.e. that also with them, cheap active and passive switching elements of wide tolerances in their rated values may be used, so that it will be possible to manufacture them as thick-film integrated circuits.

We claim:

1. A switchgear comprising a plurality of switching units including command devices, switching devices and signalling devices combined to effect predetermined switching functions, each of the command devices and the switching devices including transmitters for delivering command signals in response to required operating conditions of said devices, each of the switching devices and signalling devices including receivers for receiving command signals, said receivers including storage means for storing the received signals and evaluation means for evaluating the stored signals, a central unit for producing address signals in cyclic sequence, the same address signal being assigned to functionally correlated transmitters and receivers, and a control cable interconnecting a plurality of said transmitters and receivers and connecting said plurality of transmitters and receivers to said central unit, each of said transmitters and receivers being responsive to a definite address signal produced by said central unit, said central unit comprising a signal generator for producing read-out signals of shorter duration than the duration of the address signal, a read-out conductor connecting the output of the read-out signal generator to said receivers of the switchgear, each receiver comprising switching members adapted to release the receiver for the reception of a command signal only when it simultaneously receives the signals of its address and a read-out signal, and a gate circuit connected between, the output of said read-out signal generator and the read-out conductor, said gate circuit having control inputs connected to the outputs of a transmitter-control circuit and of a receiver-control circuit, in order to block the passage of the read-out signals through the gate circuit when its control circuit receives a blocking signal from the transmitter-control circuit and/or from the receiver-control circuit.

2. A switchgear according to claim 1, in which each of said transmitters and receivers is adjustable to one of the addresses produced by said central unit.

3. A switchgear according to claim 1, in which said control cable interconnecting said transmitters and receivers includes a signalling conductor passing through the central unit for amplification of the signals.

4. A switchgear according to claim 1, in which a plurality of slide-in units are provided containing said command, switching and signalling devices and inserted into shelves of a switch box and connected to mains, each slide-in unit comprising the transmitters and/or receivers for said devices contained therein, and the transmitters and receivers of all slide-in units being connected to a control cable interconnecting said plurality of slide-in units.

5. A switchgear according to claim 4, in which said control cable passes over the slide-in shelves of said slide box, and each shelf comprises terminal means for connecting the transmitters and receivers of the slide-in unit to be inserted thereon.

6. A switchgear according to claim 5, in which said terminal means are plug and socket connections.

7. A switchgear according to claim 3, wherein each slide-in unit comprises exchangeable address units for its transmitters and/or receivers.

8. A switchgear according to claim 1, in which each of said transmitters supplies command signals in the form of information signals which are complementary to one another, conductors connecting the outputs of the transmitters to the transmitter-control circuit, the transmitter-control circuit being a comparator circuit adapted to deliver a blocking signal to the gate circuit of the read-out signal generator when the received information signals are not complementary.

9. A switchgear according to claim 8, in which said transmitters produce said command signals in the form of binary signals and each transmitter comprises two separate outputs, one for the direct information signal and one for the inverse information signal of a command signal, said outputs being connected to two separate inputs of the transmitter-control circuit, the transmitter control circuit including means for delivering a blocking signal to the gate circuit of the read-out signal generator when a direct and an inverse information signal are not applied simultaneously at both inputs of the transmitter-control circuit.

10. A switchgear according to claim 1, in which each of said receivers, upon reception of its address signals, delivers a control signal to a control output, said control outputs of the receivers being connected to the input of the receiver-control circuit so that the latter delivers a blocking signal to the gate circuit of the read-out signal generator when no control signal is present at its input, or when control signals of at least two receivers are not simultaneously present at its input.

11. A switchgear according to claim 1, in which for the production of read-out signals and address signals consisting of binary signals, the central unit comprises a timing pulse generator and a binary counter connected to the pulse generator, the different stages of said binary counter supplying pulse sequences of successively double periods, a read-out pulse generator being formed by the first stages of the binary counter and by a logical circuit, and each successive stage of the binary counter being connected with an address conductor of said control cable.

12. A switchgear according to claim 11, in which said logical circuit of the read-out pulse generator comprises a first NAND-gate and a second NAND-gate, each NAND-gate having two inputs, one input of the first NAND-gate being connected to the output of the first stage of said binary counter, and its other input being connected to the output of the second stage of the binary counter, and one input of the second N–AND-gate being connected to the output of the first N–AND-gate and its other input to the output of the third stage of the binary counter, and the output of the second N–AND-gate being connected to the output terminal of the read-out pulse generator.

13. A switchgear according to claim 10, in which each of said transmitters and each of said receivers comprises a basic circuit having a transistorized decoding circuit for the address signals, the decoding circuit including a n–p–n output transistor whose collector is connected by a first voltage divider to a first terminal for supplying positive operating voltage, and whose emitter is connected to a second terminal for a zero conductor, said output transistor becoming conductive when the decoding circuit receives the signals with the address assigned to it, and said basic circuit including a second n–p–n transistor whose emitter is connected by a first diode with a third terminal, whose collector is connected by a second voltage divider with said first terminal and whose base is connected by a resistor with a fourth terminal and by a further resistor with a fifth terminal, said basic circuit further including a third p–n–p transistor whose emitter is connected to said first terminal for positive operating voltage, whose collector is connected to a sixth terminal and whose base is connected to the center tap of said second voltage divider, and finally the basic circuit including a third p–n–p transistor whose emitter is connected to said first terminal for positive operating voltage, whose collector is connected to a seventh terminal and whose base is connected by a resistor to said first terminal as well as by a Zener-diode, a second diode and a resistor to the collector of said output transistor of the decoding circuit, the collector of said output transistor being connected to an eighth terminal, the center tap of said first voltage divider connected to the emitter of said output transistors, being connected to a ninth terminal, and a tenth terminal being connected by a third diode to the junction point between said second diode and said resistor which is connected to the collector of said output transistor.

14. A switchgear according to claim 13, in which in said transmitters the eighth terminal, connected to the collector of said output transistor of the decoding circuit, is connected to said third terminal by said first diode which is connected to said first transistor of said basic circuit, said fourth terminal is connected by a resistor to the base of said first transistor, and said fifth terminal, connected by a resistor to the base of said first transistor, is connected to each of two input terminals for supplying the signals denoting the operating condition of the command or switching devices assigned to the respective transmitter, said sixth terminal is connected to the collector of said second transistor of the basic circuit, said tenth terminal connected by said third diode with the junction point between said second diode and a resistor connected to the collector of said output transistor being connected to each other and to a first output terminal which delivers the direct information signal of the command signals, and said seventh terminal, which is connected to the collector of said third transistor of the basic circuit being connected to a second output terminal which delivers the inverse information signal of the command signals.

15. A switchgear according to claim 13, in which in said receivers said ninth terminal connected to the center tap of the first voltage divider is connected to said third terminal connected by said first diode to the emitter of said first transistor, the fourth or fifth terminal which are both connected by resistors to the base of said first transistor of the basic circuit is connected to a first input terminal for supplying the transmitter signals, said tenth terminal, which is connected by said third diode with the junction point between the second diode and a resistor connected to the collector of said output transistor, is connected to a second input terminal for supplying the read-out signals, while for furnishing a receiver-control signal, said eighth terminal connected to said output transistor of the decoding circuit is connected by a fourth diode and a resistor series connected therewith, to the receiver-control circuit, said sixth terminal, connected to the collector of said second transistor of the basic circuit and said seventh terminal connected to the collector of said third transistor, being each grounded by a voltage divider and the center taps of the two voltage dividers being connected by a storage and evaluation circuit with output terminals.

16. A switchgear according to claim 15, in which said storage and evaluation circuit comprises a first N-AND-gate and a second N-AND-gate, one input of both N-AND-gates being connected to the center tap of one of said voltage dividers and the second input of one of the first N-AND-gate being connected to the center tap of the other of said voltage dividers, the output of the first N-AND-gate being connected with the second input of the second N-AND-gate, and the outputs of both N-AND-gates being connected to both inputs of a memory element formed by two N-AND-gates.

17. A switchgear according to claim 9, in which said transmitter-control circuit consists of an OR gate, and a transistorized matching circuit for the direct and the inverse information signals, is connected to each input of the OR gate.

18. A switchgear according to claim 1, in which said receiver-control circuit consists of two two-stage amplifiers having each a p-n-p transistor in the first stage and a n-p-n transistor in the second stage, the base of the transistor of the first stage of one of the amplifiers being connected by a Zener-diode with the terminal carrying the positive operating voltage, and being connected to the emitter of the other transistor of the first stage of the other amplifier, the emitter of said other transistor being connected with the input terminal for the receiver-control signals from said receivers, and in each of the two amplifiers the emitter-collector spacing of said n-p-n transistors is bridged by a load resistor and connected to an output terminal.

19. A switchgear according to claim 11, in which the gate circuit connected to the read-out pulse generator is a N-AND-gate having four inputs, one of which is connected to one output of the receiver-control circuit, a second input to the other output of the receiver-control circuit, a third input to the output of an OR gate of the transmitter-control circuit and the fourth input is connected by a inversion element to the output of said read-out signal generator.

* * * * *